United States Patent
Christen et al.

(10) Patent No.: US 9,499,066 B2
(45) Date of Patent: Nov. 22, 2016

(54) METHOD FOR DETERMINING A CHARGE ACCEPTANCE, AND METHOD FOR CHARGING A RECHARGEABLE BATTERY

(75) Inventors: Urs Christen, Aachen (DE); Paolo Romano, Lausanne (CH); Eckhard Karden, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 963 days.

(21) Appl. No.: 13/554,013

(22) Filed: Jul. 20, 2012

(65) Prior Publication Data

US 2013/0020994 A1 Jan. 24, 2013

(30) Foreign Application Priority Data

Jul. 20, 2011 (DE) .................. 10 2011 079 469

(51) Int. Cl.
| | | |
|---|---|---|
| *G01R 31/36* | (2006.01) | |
| *H02J 7/00* | (2006.01) | |
| *G06F 19/00* | (2011.01) | |
| *B60L 11/18* | (2006.01) | |
| *H01M 10/44* | (2006.01) | |

(52) U.S. Cl.
CPC ........ *B60L 11/1864* (2013.01); *B60L 11/1861* (2013.01); *H01M 10/441* (2013.01); *H01M 2220/20* (2013.01); *H02J 2007/0037* (2013.01); *Y02T 10/7005* (2013.01); *Y02T 10/7016* (2013.01); *Y02T 10/7044* (2013.01); *Y02T 10/7061* (2013.01)

(58) Field of Classification Search
CPC .................................................. G01R 31/3651
USPC ............ 320/109, 132, 134, 149, 157, 636.1, 320/636.12; 702/64
See application file for complete search history.

(56) References Cited

U.S. PATENT DOCUMENTS

| | | | |
|---|---|---|---|
| 6,229,285 B1 | 5/2001 | Ding | |
| 6,495,992 B1* | 12/2002 | Pavlovic | .............. 320/161 |
| 7,564,221 B2 | 7/2009 | Asai et al. | |
| 2007/0145953 A1* | 6/2007 | Asai et al. | .............. 320/149 |
| 2011/0313613 A1* | 12/2011 | Kawahara et al. | .............. 701/29 |

FOREIGN PATENT DOCUMENTS

| | | |
|---|---|---|
| CN | 1607398 A | 4/2005 |
| WO | 2010-109956 | 9/2010 |
| WO | 2011-045262 A1 | 4/2011 |

OTHER PUBLICATIONS

Battery performance models in ADVISOR, Journal of Power Sources 110 (2002) pp. 321-329.

* cited by examiner

*Primary Examiner* — Edward Tso
*Assistant Examiner* — Dung V Bui
(74) *Attorney, Agent, or Firm* — David B. Kelley; Brooks Kushman P.C.

(57) ABSTRACT

In the case of a method for determining a charge acceptance $I_{CA}$ of a rechargeable battery, the battery is computationally split up into a predetermined number n of compartments i having a respective maximum charge capacitance $C_i$, which are connected in parallel via resistances $R_i$, and the charge acceptance $I_{CA}$ of the battery is determined on the basis of the charge capacitance $C_1$ and the resistance $R_1$ of the compartment adjacent to the battery terminals. The invention also relates to a method for charging a rechargeable battery.

8 Claims, 1 Drawing Sheet

METHOD FOR DETERMINING A CHARGE ACCEPTANCE, AND METHOD FOR CHARGING A RECHARGEABLE BATTERY

CROSS-REFERENCE TO RELATED APPLICATIONS

The present application claims priority to German Patent Application No. 102011079469.7, filed Jul. 20, 2011, titled "Method for determining a charge acceptance, and method for charging a rechargeable battery."

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a method for determining a charge acceptance of a rechargeable battery, and to a method for charging a rechargeable battery.

2. Background

In motor vehicles, batteries serve to store electrical energy. The batteries supply energy for starting an internal combustion engine of the motor vehicle, and likewise supply additional electrical energy for other loads that must be operated both when the engine is running and when it is not running. The batteries are charged by a generator driven by the internal combustion engine.

In order to save fuel, it is known to charge the batteries by recovering the kinetic energy of the motor vehicle that was converted during braking, that is to say to convert kinetic energy into electrical energy, this being done by an appropriate control of the generator during braking of the motor vehicle. To this end, various methods have been developed that are intended to ensure optimum use of the battery and optimum recovery of the energy. In particular, battery monitoring systems (BMSs) have been developed that determine the instantaneous state of charge (SOC), that is to say the fraction of the currently maximum storable charge that is actually currently stored, and the instantaneous charge capacity (state of health, SOH), that is to say the fraction of the desired capacity of the battery that can currently be utilized, in order to control the charging of the battery. In many cases, a time integration of the current passed suffices for determining the instantaneous state of charge SOC, resetting to a fixed value possibly being required. The available charge capacity SOH drops in the course of the battery's service life. Methods for determining the state of charge SOC and the charge capacity SOH within a battery monitoring system are known, for example, from DE 10 2006 001 201 B4, DE 10 2007 050 346 A1 and DE 10 2008 034 461 A1.

Optimum control of the charging operation during braking of the motor vehicle requires, in particular, knowledge of the instantaneous charge acceptance, that is to say of the maximum charging current that can be accepted by the battery at the given instant. Particularly given the lead-acid batteries widely used in motor vehicles, the charge acceptance depends on a multiplicity of parameters that, in particular, are associated with prior charging and discharging phases, and said acceptance has to be determined not only from the state of charge SOC and/or the charge capacity SOH.

BRIEF SUMMARY OF THE INVENTION

In the case of an inventive method for determining a charge acceptance $I_{CA}$ of a rechargeable battery, the battery is computationally split up into a predetermined number n of compartments i having a respective maximum charge capacitance $C_i$, which are connected in parallel via resistances $R_i$. In a computational model of said type, the respective charge capacitances $C_i$ and the resistances $R_i$ are thereby prescribed, and the properties of the equivalent circuit represented hereby are modeled. In this process, the compartments need not correspond to the physical cells of the battery. The sum of all the charge capacitances $C_i$ yields the total instantaneous charge capacitance $C_{batt}$ of the battery. According to the invention, the charge acceptance $I_{CA}$ of the rechargeable battery is estimated on the basis of the charge capacitance $C_1$ and the resistance $R_1$ of the compartment directly adjacent to the battery terminals. The charge acceptance thus determined constitutes an instantaneous charge acceptance $I_{CA,inst}$ of the battery.

It has emerged that said model or said simple equivalent circuit constitutes a very good approximation to the actual behavior of many rechargeable batteries, and is suitable for determining the charge acceptance $I_{CA}$. Since charging operations that serve to recover the kinetic energy of a motor vehicle during braking last only for a short time span of a few seconds, as a rule, the instantaneous charge acceptance $I_{CA,inst}$ in such cases is already a relatively accurate estimate for the charge acceptance $I_{CA}$ of the rechargeable battery. This estimate is, however, frequently accurate enough even in the cases where the battery is charged by the internal combustion engine of the motor vehicle. It is possible hereby to arrive in a simple way at an optimized control of the charging operation for recovering energy.

In a preferred way, the charge acceptance $I_{CA}$ of the battery is determined by taking account of the charge capacitances $C_i$ and the resistances $R_i$ of further compartments i following the compartment i=1 adjacent to the battery terminals. In particular, all the compartments i=1, 2, ..., n can be taken into account in this process. An improved accuracy can thereby be attained in the determination of the charge acceptance $I_{CA}$ of the battery.

It is preferred, furthermore, that an average charge acceptance $I_{CA,avg}$ be determined which constitutes the average charge acceptance for a charging operation lasting over a time period $\Delta t$. In particular, the time period $\Delta t$ can be a few seconds long, for example, $\Delta t=10$ sec, and this corresponds to a typical time duration in the recuperation of kinetic energy of the motor vehicle. It is possible hereby to attain a further improved estimate of the charge acceptance in typical situations.

In accordance with a preferred embodiment of the invention, the compartments i are selected in such a way that the charge capacitances $C_i$ increase with the index i. The compartments selected for the computational model correspond in this case, in particular, not to the physical cells of the battery, but respectively have a larger charge capacitance $C_i$ with increasing index i, that is to say with increasingly indirect connection to the terminals of the battery. In a particularly preferred way, the charge capacitances $C_i$ increase with the index i in an exponential way. It has emerged that this enables a particularly accurate and computationally simple estimate of the charge acceptance $I_{CA}$ of the battery.

Furthermore, it is preferred that the instantaneous state of charge SOC and/or the instantaneous charge capacity SOH be taken into account when determining the charge acceptance $I_{CA}$ of the battery. Both the instantaneous state of charge SOC and the instantaneous charge capacity SOH can be determined in a way known per se, for example from the current and/or the voltage of the battery in preceding charging and discharge phases. By taking account of the instantaneous state of charge SOC and/or the instantaneous charge capacity SOH, it is possible to further improve the accuracy in the estimate of the charge acceptance $I_{CA}$ of the battery.

In an advantageous way, it is possible when determining the charge acceptance $I_{CA}$ of the battery to take account of a measured battery voltage $U_{batt,meas}$ and/or a measured temperature θ of the battery. The accuracy of the determined charge acceptance $I_{CA}$ is also improved hereby.

In accordance with a further advantageous embodiment of the invention, respectively a first resistance value $R_{ci}$ is assumed during charging, and a second resistance value $R_{di}$ is assumed during discharging of the battery, for each compartment. By taking account of different resistance values, depending on whether the current flowing through the relevant resistance is positive or negative, it is possible to attain a further increase in accuracy.

In a preferred way, the above-described method is suitable for determining the charge acceptance of a lead-acid battery. Such a battery can, for example, be filled (flooded) with acid in free form into which the lead electrodes dip, or contain acid bound by a nonwoven made from glass fibers (absorptive glass mat, AGM). However, in principle the invention is also suitable for other types of rechargeable batteries.

In an inventive method for charging a rechargeable battery, a charge acceptance $I_{CA}$ of the battery is determined using the above-described method, and a charging current and/or a charging voltage is regulated in such a way that the charging current does not exceed the charge acceptance $I_{CA}$ of the battery. In this case, furthermore, it is possible to stipulate a limitation of the charging voltage by the highest permissible voltage with a point of view of safety in motor vehicles, as well as a limitation of the rate of charge of an on-board system voltage by the fact that a driver of the motor vehicle should as far as possible be unable to perceive fluctuations caused thereby, for example in the brightness of headlights or lamps. During operation of a motor vehicle, it is, for example, also possible to decide, on the basis of the determined charge acceptance $I_{CA}$ of the battery, whether the battery is being charged solely by operating the generator during braking, or whether the internal combustion engine of the motor vehicle is started for charging. This results in a particularly efficient control of the charging operations of the battery, in particular for motor vehicles with recovery of the kinetic energy and/or automatic stop-start systems (micro-hybrid vehicles).

BRIEF DESCRIPTION OF THE DRAWINGS

The invention is explained below in more detail by way of example with the aid of the drawings.

DETAILED DESCRIPTION OF THE INVENTION

Figure 1:
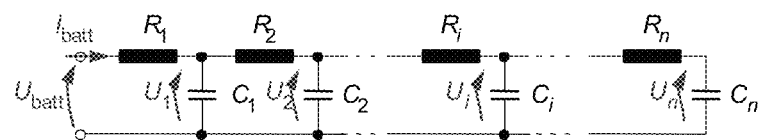
FIG. 1 shows a circuit diagram that is based on an embodiment of the inventive method for determining the charge acceptance of a battery.

The phenomenological battery model described below with reference to an exemplary embodiment of the invention proceeds from a computational, that is to say virtual, discretization of the battery by splitting it up into a prescribed number of compartments i that need not correspond to the physical cells or plates of the battery. A circuit diagram corresponding to this model is illustrated in FIG. 1.

A system consisting of differential equations is yielded for the voltage $U_i$ in each compartment, namely:

$$\dot{U}_i = \frac{1}{C_i}\left(\frac{U_{i-1} - U_i}{R_i} - \frac{U_i - U_{i+1}}{R_{i+1}}\right)$$

$$i = 1 \ldots n,$$

wherein $U_0 = U_{batt}$ $U_{n+1} = 0$ $R_{n+1} = \infty$.

The current flowing at the terminals of the battery is $$I_{batt} = \frac{U_{batt} - U_1}{R_1},$$

and the voltage at the terminals of the battery is $$U_{batt} = U_1 + R_1 I_{batt}.$$

The number n of the compartments is preferably selected such that, on the one hand, there are sufficient compartments present to achieve a modeling of the desired accuracy and, on the other hand, not too many, so that the model can be executed computationally in the required reaction times with the aid of the computing capacity of a control unit customary in motor vehicle construction. It has proved to be advantageous as a rule to select between, for example, n=4 and n=12 compartments. By optimizing the parameters with the aid of measured data, it is possible to determine for each given type of battery the respective capacitances $C_i$ and resistances $R_i$, which differ respectively for the individual compartments i. Here, the sum of all the capacitances $C_i$ of the compartments equals the total charge capacitance $C_{batt}$ of the battery:

$$\sum_{i=1}^{n} C_i = C_{batt}.$$

Examples of typical values for $C_i$ and $R_i$ are specified in the following table for two different types of battery, specifically for a lead-acid battery with acid bound in an absorptive glass mat (AGM), and a lead-acid battery having lead electrodes dipping into free acid (flooded):

TABLE 1

Typical values for $C_i$ and $R_i$

| Lead-acid battery (AGM) | | | | | | Lead-acid battery (flooded) | | | | | |
|---|---|---|---|---|---|---|---|---|---|---|---|
| $C_i$ [kF] | | | $R_i$ [mΩ] | | | $C_i$ [kF] | | | $R_i$ [mΩ] | | |
| n = 4 | n = 8 | n = 12 | n = 4 | n = 8 | n = 12 | n = 4 | n = 8 | n = 12 | n = 4 | n = 8 | n = 12 |
| 0.20 | 0.10 | 0.052 | 7.0 | 7.0 | 7.0 | 0.34 | 0.11 | 0.052 | 18 | 18 | 18 |
| 1.9 | 0.28 | 0.10 | 10 | 9.4 | 7.4 | 2.8 | 0.31 | 0.10 | 32 | 20 | 18 |
| 18 | 0.77 | 0.20 | 17 | 9.5 | 7.4 | 23 | 0.84 | 0.21 | 130 | 22 | 19 |
| 167 | 2.1 | 0.40 | 87 | 12 | 7.5 | 186 | 2.3 | 0.42 | 820 | 26 | 20 |
|  | 5.8 | 0.79 |  | 13 | 7.6 |  | 6.4 | 0.83 |  | 51 | 22 |
|  | 16 | 1.6 |  | 27 | 7.8 |  | 18 | 1.7 |  | 80 | 25 |
|  | 43 | 3.1 |  | 35 | 8.4 |  | 49 | 3.3 |  | 790 | 30 |
|  | 119 | 6.1 |  | 390 | 9.0 |  | 135 | 6.6 |  | 970 | 39 |
|  |  | 12 |  |  | 17 |  |  | 13 |  |  | 55 |
|  |  | 24 |  |  | 43 |  |  | 26 |  |  | 390 |
|  |  | 47 |  |  | 270 |  |  | 53 |  |  | 440 |
|  |  | 92 |  |  | 2500 |  |  | 106 |  |  | 6200 |

In order to improve the model, the state of charge SOC of the battery can be determined, and integrated into the model via a correction. The state of charge SOC is determined by the formula $$SOC = \frac{Q - Q_{min}}{Q_{max} - Q_{min}} = \frac{1}{C_{batt}(U_{oc,max} - U_{oc,min})} \sum_{i=1}^{n} C_i(U_i - U_{oc,min}),$$

Q being the instantaneously stored charge, $Q_{min}$ being the charge that remains in the battery when the minimum voltage $U_{oc,min}$ is reached in an open circuit, $Q_{max}$ being the maximum charge that is stored when the battery is in an open circuit at the maximum voltage $U_{oc,max}$, and $C_{batt}$ being the battery capacitance (see above). Should this result in a deviation from the state of charge $SOC_{BMS}$ determined by a battery monitoring system, this deviation can be introduced into the model equation as an additional term $H_{SOC}$ ($SOC_{BMS}$−SOC) in order to further improve the accuracy of the model.

Furthermore, in order to improve the model, the charge capacity SOH of the battery that has been determined by a battery monitoring system can be introduced into the model as a correction of the charge capacitances of all the compartments:

$$\tilde{C}_i = C_i \cdot SOH,$$

SOH lying in the region between 0 and 1.

Finally, the current or the voltage can be calculated from the model and compared with the measured current or the measured voltage at the terminals of the battery. This yields a further correction $H_U(U_{batt,meas} - U_{batt})$ that can be introduced in order to correct the voltages $U_i$ of the individual compartments.

In principle, all the variables may be dependent on temperature, in particular the resistances $R_i$. The temperature dependence of the resistances $R_i$ can, for example, be modeled by $$R_i(\theta) = (a_3\theta^3 + a_2\theta^2 + a_1\theta + a_0)R_i,$$

it being possible, by way of example, to select:

$a_3 = -7.292 \times 10^{-7}$ (° C.)$^{-3}$, $a_2 = 1.509 \times 10^{-4}$ (° C.)$^{-2}$, $a_1 = -9.869 \times 10^{-3}$ (° C.)$^{-1}$, $a_0 = 1.147$;

the result for $\theta_0 = 20°$ C. being $R_i(\theta) = R_i$. It follows that a further improvement can be attained by measuring and taking account of the temperature of the battery.

In order to charge the battery, there must in any case be present at the terminals of the battery a voltage $U_{ch}$ that is higher than the voltage $U_1$ provided by the battery. It holds for the instantaneous charging current accepted by the battery, that is to say for the instantaneous charge acceptance $I_{CA,inst}$, that:

$$I_{CA,inst} = \frac{U_{ch} - U_1}{R_1}.$$

For a brief charging operation, it suffices to take account of the first compartment of the model. For longer lasting charging operations, there is a need to determine an average charge acceptance $I_{CA,avg}$, for example one averaged over a time interval $\Delta t$. In a vector notation, this is summarized as:

$$\tilde{C}_i = C_i \cdot SOH$$
$$R_i = R_i(\vartheta)$$

$$\begin{bmatrix} \dot{U}_1 \\ \dot{U}_2 \\ \vdots \\ \dot{U}_i \\ \vdots \\ \dot{U}_n \end{bmatrix} = \begin{bmatrix} \frac{-1}{\tilde{C}_1 R_2} & \frac{1}{\tilde{C}_1 R_2} & 0 & 0 & \cdots & 0 \\ \frac{1}{\tilde{C}_2 R_2} & \frac{-1}{\tilde{C}_2}\left(\frac{1}{R_2} + \frac{1}{R_3}\right) & \frac{1}{\tilde{C}_2 R_3} & 0 & \cdots & 0 \\ 0 & & \cdots & & & 0 \\ 0 \cdots & & \frac{1}{\tilde{C}_i R_i} & \frac{-1}{\tilde{C}_i}\left(\frac{1}{R_i} + \frac{1}{R_{i+1}}\right) & \frac{1}{\tilde{C}_i R_{i+1}} & \cdots & 0 \\ 0 & & & \cdots & & 0 \\ 0 & & & \cdots & 0 & \frac{1}{\tilde{C}_n R_n} & \frac{-1}{\tilde{C}_n R_n} \end{bmatrix} \begin{bmatrix} U_1 \\ U_2 \\ \vdots \\ U_i \\ \vdots \\ U_n \end{bmatrix} + \begin{bmatrix} \frac{1}{\tilde{C}_1} \\ 0 \\ \vdots \\ 0 \\ \vdots \\ 0 \end{bmatrix} I_{batt} +$$

$$H_{SOC}(SOC_{BMS} - SOC) + H_U(U_{batt,meas} - U_{batt})$$

$$U_{batt} = U_1 + R_1 I_{batt}$$

$$SOC = \frac{1}{C_{batt} \cdot SOH(U_{max} - U_{min})} \sum_{i=1}^{n} \tilde{C}_i (U_i - U_{min})$$

$$I_{CA,inst} = \frac{U_{ch} - U_1}{R_1}$$

$$I_{CA,avg} = C_{avg} U + (C_{avg} B + D_{avg}) U_{ch},$$

the battery current $I_{batt}$, the measured battery voltage $U_{batt, meas}$, the charging voltage $U_{ch}$, the state of charge $SOC_{BMS}$, the charge capacity SOH and the temperature $\theta$ being input variables. In particular, the resistance values $R_i$ are temperature-dependent. U is the column vector having the components $U_i$, B is the column vector having the components $1/C_i R_i$. B, $C_{avg}$ and $D_{avg}$ depend on $\tilde{C}_i$, $R_i$ and $\Delta t$; here, $C_{avg}$ and $D_{avg}$ are determined with the aid of transition matrices. A time-discrete form of the model is preferably used to implement the model in a control unit. The corresponding matrices for $C_{avg}$ and $D_{avg}$ can then also be derived directly from the time-discrete matrices of the remainder of the model.

According to the invention, use is therefore made of a simple phenomenological model of the battery that permits the state of the battery to be determined, and is improved by correction with the aid of measured variables. This model is then also used to estimate the charge acceptance of the battery.

Use is hereby made of a simple model to record all the important procedures in the operation and charging of a rechargeable battery, in particular of a lead-acid battery, specifically the ability of the battery to store and output electrical energy, the approximately exponential behavior of the voltage and the current during charging and discharging with a constant current or constant voltage, and the dependence of the charge acceptance on time, on the state of charge SOC and on prior charging and discharging operations, as well as on the length of time between discharging and charging. Furthermore, the temperature dependence of the charge acceptance of the battery, and the reduction of the charge capacity (SOH) with advancing age of the battery, can be reproduced according to the model. The entire acceptable charge is limited, but this limit and the gas evolution occurring upon charging exceeding said limit do not play any role in the present case, since the battery is operated below the fully charged state, as a rule.

Figure 2:
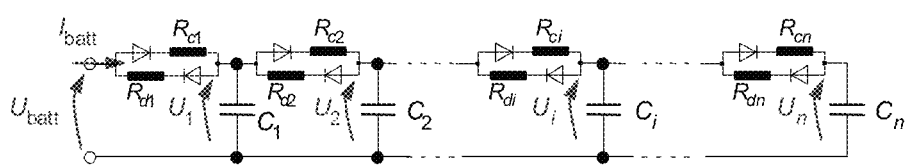
FIG. 2 shows a circuit diagram that is based on a further embodiment of the inventive method for determining the charge acceptance of a battery.

In a development of the inventive model, different values can be assumed for the resistances, depending on the direction in which the current flows, that is to say respectively a first resistance value $R_{ci}$ for charging, and a second resistance value $R_{di}$ for discharging of the battery. The corresponding circuit diagram is illustrated in FIG. 2. A further improvement of the accuracy of the modeling can be achieved in this way. In particular, different time constants can be recorded in this way by the model for charging and for discharging.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system comprising:
   a control unit to charge a vehicle battery, by operating a generator during braking or starting an engine, according to a charge acceptance $I_{CA}$ derived from computationally splitting the battery into a predetermined number of compartments i having respective maximum charge capacitances $C_i$ and connected in parallel via resistances $R_i$, and taking account of all $R_i$ and $C_i$, the compartments i being selected such that $C_i$ increases exponentially with i.

2. The system as claimed in claim 1, wherein at least one of an instantaneous state of charge SOC, an instantaneous charge capacity SOH, a measured battery voltage $U_{batt, meas}$, and a temperature $\theta$ of the battery is taken into account.

3. The system as claimed in claim 2, wherein respectively a first resistance value $R_{ci}$ is taken into account during charging, and a second resistance value $R_{di}$ is taken into account during discharging of the battery.

4. The system as claimed in claim 3, wherein a charging current or a charging voltage is regulated in such a way that the charging current does not exceed the charge acceptance $I_{CA}$ of the battery.

5. A method comprising:
   charging, by a control unit, a vehicle battery, by operating a generator during braking or starting an engine, according to a charge acceptance $I_{CA}$ derived from computationally splitting the battery into a predetermined number of compartments i having a respective maximum charge capacitance $C_i$ and connected in parallel via resistances $R_i$, and taking account of all $R_i$ and $C_i$, the compartments i being selected such that $C_i$ increases exponentially with i.

6. The method as claimed in claim 5, wherein at least one of an instantaneous state of charge SOC, an instantaneous charge capacity SOH, a measured battery voltage $U_{batt, meas}$, and a temperature $\theta$ of the battery is taken into account.

7. The method as claimed in claim 6, wherein respectively a first resistance value $R_{ci}$ is taken into account during charging, and a second resistance value $R_{di}$ is taken into account during discharging of the battery.

8. The method as claimed in claim 7, wherein a charging current or a charging voltage is regulated in such a way that the charging current does not exceed the charge acceptance $I_{CA}$ of the battery.

* * * * *